US009791901B2

(12) United States Patent
Tufford et al.

(10) Patent No.: US 9,791,901 B2
(45) Date of Patent: Oct. 17, 2017

(54) SAFETY RELAY BOX SYSTEM

(71) Applicant: Artesyn Embedded Computing, Inc., Tempe, AZ (US)

(72) Inventors: Robert Charles Tufford, Chandler, AZ (US); Liu Jiang, Shenzhen (CN); Pasi Jukka Petteri Vaananen, Waltham, MA (US); Martin Peter John Cornes, Phoenix, AZ (US)

(73) Assignee: Artesyn Embedded Computing, Inc., Tempe, AZ (US)

( * ) Notice: Subject to any disclaimer, the term of this patent is extended or adjusted under 35 U.S.C. 154(b) by 143 days.

(21) Appl. No.: 14/141,580

(22) Filed: Dec. 27, 2013

(65) Prior Publication Data
US 2015/0168993 A1 Jun. 18, 2015

(30) Foreign Application Priority Data

Dec. 16, 2013 (CN) .......................... 2013 1 0689383

(51) Int. Cl.
| | |
|---|---|
| G06F 1/16 | (2006.01) |
| H05K 1/14 | (2006.01) |
| G06F 1/18 | (2006.01) |
| G06F 11/18 | (2006.01) |

(Continued)

(52) U.S. Cl.
CPC ............ *G06F 1/189* (2013.01); *G05B 19/048* (2013.01); *G05B 19/05* (2013.01); *G06F 11/181* (2013.01); *G06F 11/182* (2013.01)

(58) Field of Classification Search
CPC ............ G06F 11/1608; G06F 11/1629; G06F 11/1633; G06F 11/1641; G06F 11/1645;
(Continued)

(56) References Cited

U.S. PATENT DOCUMENTS

| | | | | |
|---|---|---|---|---|
| 5,828,140 | A | * 10/1998 | Shih ......................... | G06F 1/30 307/18 |
| 6,931,568 | B2 | * 8/2005 | Abbondanzio ..... | G06F 11/2028 714/11 |

(Continued)

OTHER PUBLICATIONS

English Translation of Chinese Office Action for Application No. 201310689383.3 dated Feb. 6, 2017.

*Primary Examiner* — Jayprakash N Gandhi
*Assistant Examiner* — Stephen Sul
(74) *Attorney, Agent, or Firm* — Harness, Dickey & Pierce, P.L.C.

(57) ABSTRACT

A dual redundant computer safety relay box system includes first and second fail-safe computing systems (FSCs) individually mounted to first and second printed circuit boards. Each FSC includes two computing modules (CPUs) designated as a first CPU and a second CPU. The first and second FSC's are both connected to a safety relay box. The printed circuit boards are isolable from each other permitting maintenance on one of the printed circuit boards while operation of the FSC of the other printed circuit board is maintained. In each FSC a health signal generated from the first and second printed circuit boards of the first and second CPUs defines a multi-level dynamic pulse signal. Presence of the dynamic pulse signal produces an output identified as each of a first and a second healthy indication signal from each of the CPUs of one of the first or second FSCs.

16 Claims, 8 Drawing Sheets

(51) Int. Cl.
 *G05B 19/05* (2006.01)
 *G05B 19/048* (2006.01)

(58) Field of Classification Search
 CPC .... G06F 11/165; G06F 11/1654; G06F 11/18; G06F 11/181; G06F 11/2002; G06F 11/202; G06F 2201/85; G06F 11/1637; G06F 11/2028; G06F 11/2051; G06F 1/16; G06F 1/183; F06F 11/1637; H05K 1/14; H01H 2001/506; H01H 33/53; H01H 47/002; H01H 2001/0005; H01H 47/005; H01H 2300/026; H01H 2300/028; H01H 47/001; H01H 3/227; G05B 9/00; G05B 19/048
 USPC .......... 361/819, 626, 142, 1, 679.6; 307/326–328, 9.1, 10.1
 See application file for complete search history.

(56) References Cited

U.S. PATENT DOCUMENTS

| 7,721,149 B2* | 5/2010 | Essame ............... G06F 11/0796 714/11 |
| 2002/0152418 A1* | 10/2002 | Griffin ............... G06F 11/1645 714/11 |
| 2002/0196805 A1* | 12/2002 | Brocco ............... G06F 11/2025 370/461 |
| 2005/0063114 A1* | 3/2005 | Suhara .................... G05B 9/03 361/62 |
| 2005/0273653 A1* | 12/2005 | Zubkow ............... G06F 11/182 714/11 |
| 2007/0067674 A1 | 3/2007 | Essame et al. |
| 2007/0294574 A1* | 12/2007 | Tai ..................... G06F 11/1633 714/11 |
| 2014/0298079 A1* | 10/2014 | Dean .................. G06F 12/0246 714/4.5 |

\* cited by examiner

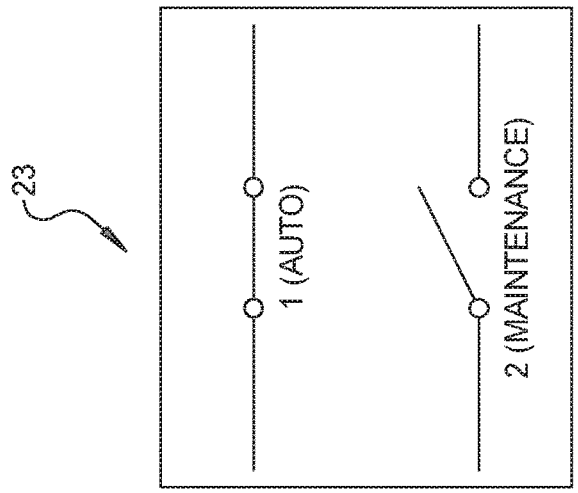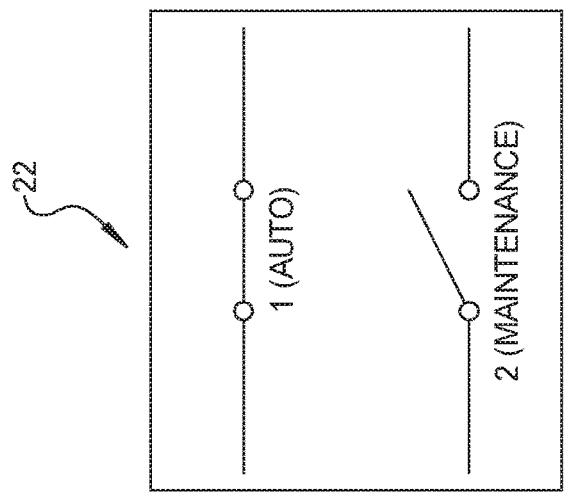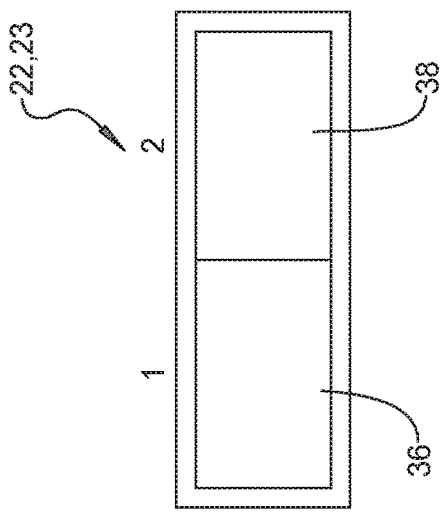
FIG 5

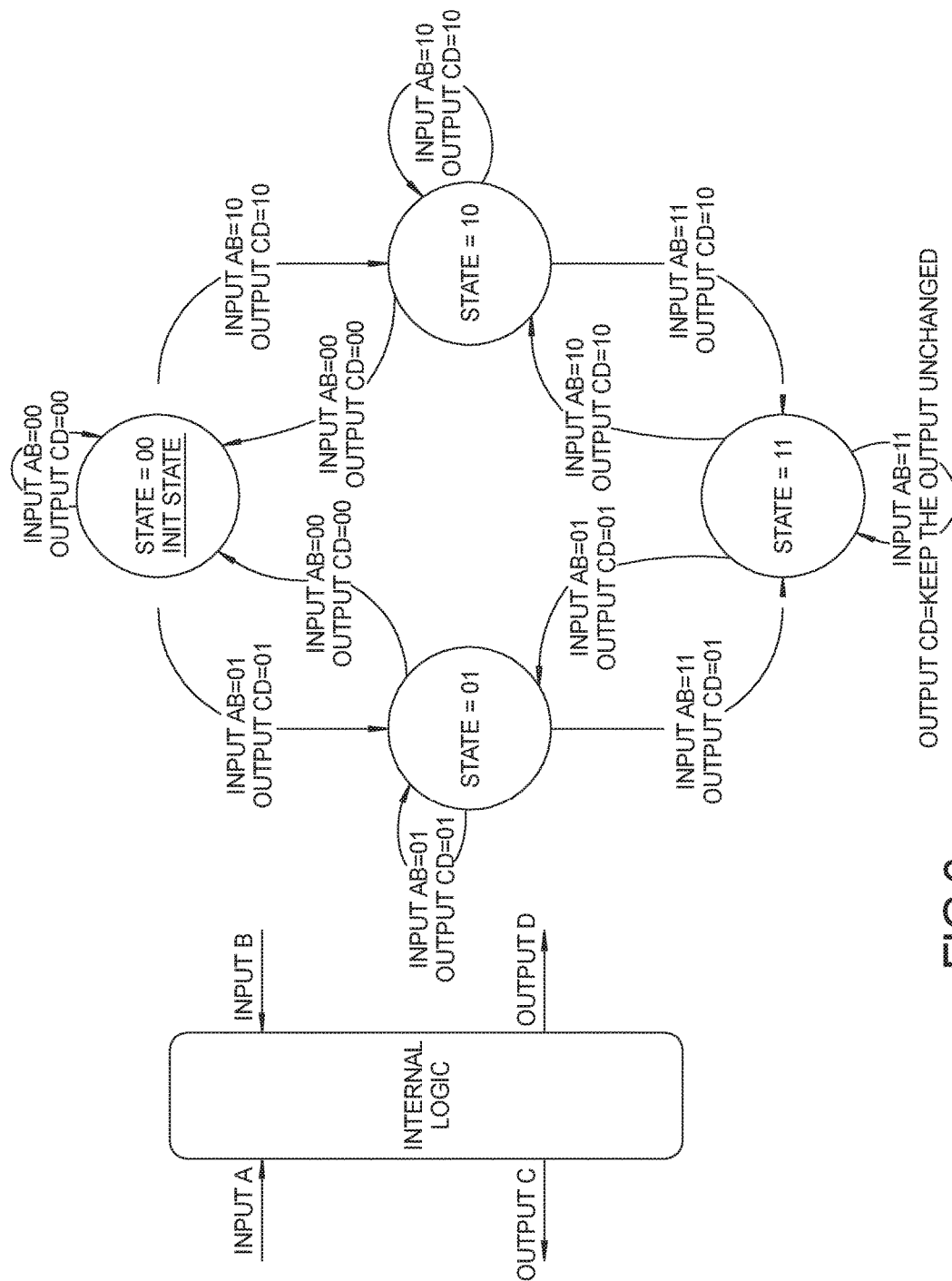

SAFETY RELAY BOX SYSTEM

CROSS-REFERENCE TO RELATED APPLICATIONS

This application claims the benefit and priority of Chinese Application No. 201310689383.3 filed Dec. 16, 2013. The entire disclosure of the above application is incorporated herein by reference.

FIELD

The present disclosure relates to safety relay boxes and systems for dual redundant computer systems.

BACKGROUND

This section provides background information related to the present disclosure which is not necessarily prior art.

The functions of providing active/standby election, failover and switchover in safety critical systems for rail and public transportation applications are commonly provided as embedded functions within a computer system. Dual redundant, high availability systems provide backup for the above functions, but also within the architecture of the computer system. Off-the-shelf (COTS) computers lack these features and have therefore not been available for direct use for rail and public transportation fail-safe applications, thereby increasing the cost and complexity of the systems. Dual redundant systems producing signals that are each active at the same time would create safety concerns. Known systems also produce either a fixed voltage signal or a zero voltage, making determination of a "stuck" command signal difficult.

SUMMARY

This section provides a general summary of the disclosure, and is not a comprehensive disclosure of its full scope or all of its features.

According to several aspects, a dual redundant computer safety relay box system includes first and second fail-safe computing systems (FSCs) individually connected to each of a first and a second printed circuit board on a safety relay box. Each FSC includes two computing modules (CPUs) designated as a first CPU and a second CPU. The first and second FSC's are both connected to a safety relay box. The printed circuit boards are isolable from each other to permit maintenance on one of the printed circuit boards on the safety relay box while operation of the FSC controlled by the other printed circuit board is maintained.

According to other aspects, a dual redundant computer safety relay box system includes first and second fail-safe computing systems (FSCs) individually connected to each of a first and a second printed circuit board on a safety relay box. Each FSC includes two computing modules (CPUs) designated as a first CPU and a second CPU defining a safety relay module portion. Both the first and second FSC's are connected to a safety relay box. In each FSC a health signal generated from the first and second printed circuit boards of the first and second CPUs defines a multi-level dynamic pulse signal. Presence of the dynamic pulse signal produces an output identified as each of a first and a second healthy indication signal from each of the CPUs of one of the first or second FSCs.

According to further aspects, a dual redundant computer safety relay box system includes first and second fail-safe computing systems (FSCs) individually connected to each of a first and a second printed circuit board on a safety relay box. Each FSC includes two computing modules (CPUs) designated as a first CPU and a second CPU. The first and second FSC's are both connected to a safety relay box. The printed circuit boards on the safety relay box are isolable from each other to permit maintenance on one of the printed circuit boards while operation of the FSC controlled by the other printed circuit board is maintained. In each FSC a health signal generated from the first and second printed circuit boards of the first and second CPUs defines a multi-level dynamic pulse signal. Presence of the dynamic pulse signal produces an output identified as each of a first and a second healthy indication signal from each of the CPUs of one of the first or second FSCs.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5 is a diagram of the manual switches of the present disclosure;

FIG. 6 is an asynchronous input Mealy state machine for the present disclosure.

Corresponding reference numerals indicate corresponding parts throughout the several views of the drawings.

DETAILED DESCRIPTION

Example embodiments will now be described more fully with reference to the accompanying drawings.

Figure 1:
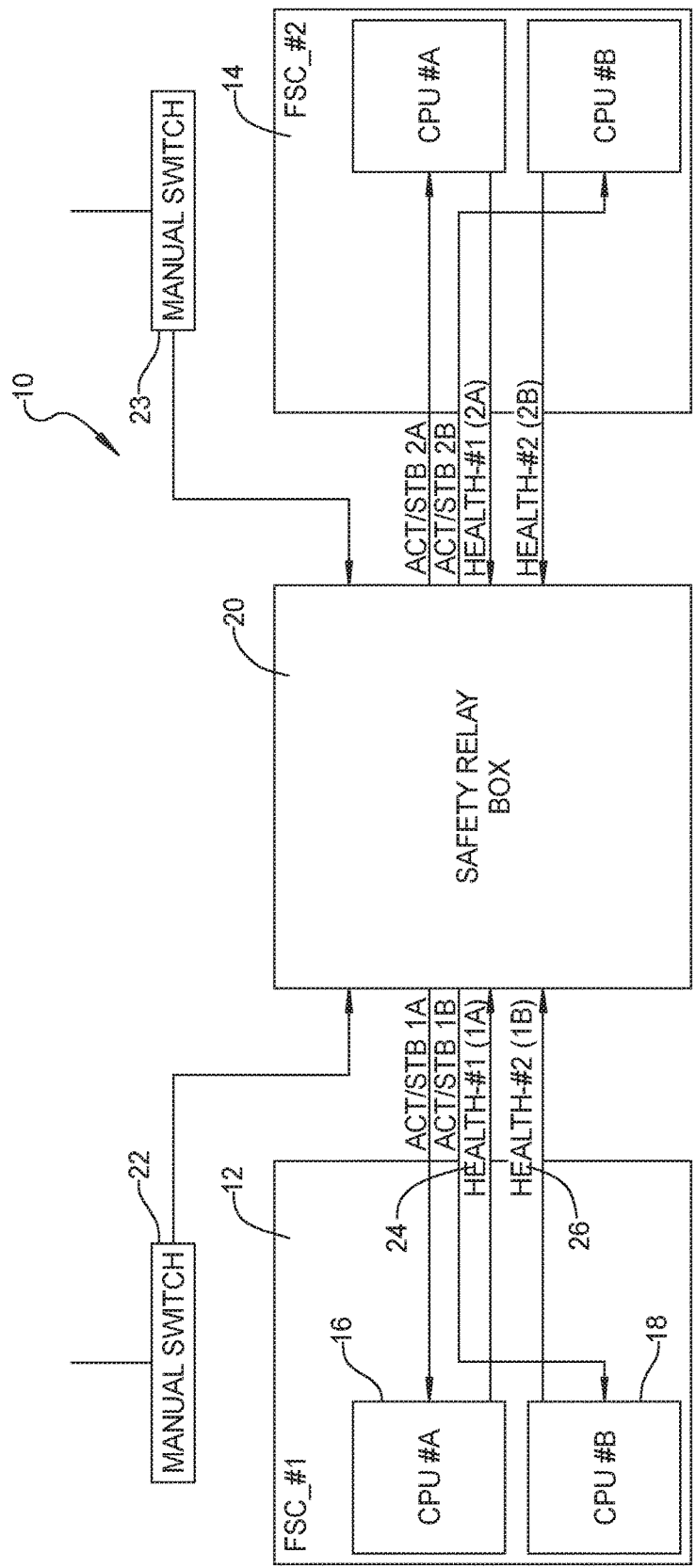
FIG. 1 is a diagram of a safety relay box system having two fail-safe computers.

Referring to FIG. 1, a safety relay box system 10 can perform as a fail-over switch in a period of approximately 500 ms, and provides two working modes, an automatic or auto-mode, and a manual mode. Safety relay box system 10 includes first and second Fail-Safe Computing Systems (or fail-safe computers) FSCs 12, 14, (hereinafter designated as FSC_#1, FSC_#2) each including two computing modules (CPUs) 16, 18 (hereinafter designated as CPU #A, CPU #B). The first and second FSC's FSC_#1, FSC_#2 are connected to a fail-over switch or safety relay box 20. The safety relay box system 10 further includes first and second manual switches 22, 23 described in greater detail in reference to FIG. 5. Safety relay box system 10 further includes multiple interconnections between the three components FSC_#1, FSC_#2 and safety-relay box 20.

In each of FSC_#1 and FSC_#2 a health signal will be generated from the CPU boards of CPU #A, CPU #B. Each health signal provides a fail-safe function. When there is a dynamic pulse signal, an output identified as health signals

24, 26 hereinafter designated as health-#1 (1A), (1B), health-#2 (2A), (2B) designate a healthy indication signal from each of CPU #A, CPU #B. It is noted health signals 1A, 1B, and 2A, 2B have a multi-level dynamic pulse with a specific period. Use of a dynamic multi-level pulse precludes the situation presented when a fixed voltage signal, commonly used to indicate an active signal condition, is actually a "false-safe" condition resulting for example from a hardware failure. If a health signal is asserted (pulsed), it indicates a healthy status of the related FSC. If it is de-asserted (a pulsed signal having a different pattern pulse from the pulsed health signal, or a fixed logic-level (non-pulsed) signal), an unhealthy status of the specific FSC is indicated. In safety relay box system 10, one FSC will be judged as healthy only when both CPU modules CPU #A, CPU #B send out healthy indication signals. Each health signal health-#1, health-#2 can also be designated health-mn, wherein 'm' indicates the identification of the specific FSC, (m=1 or 2), and 'n' indicates the identification of the CPU module in each FSC, (n=A or B).

Signals are also designated as either active or standby as active/standby-mn. An active/standby-mn signal is an indication signal sent from safety-relay box 20 back to the CPU modules CPU #A, CPU #B. Active/standby-mn signals are provided as a dynamic multi-level pulse with a specific period. If an active/standby-mn signal is asserted (pulsed), the related FSC can operate in the active mode. If an active/standby-mn signal is de-asserted (a pulsed signal having a different pattern pulse from the pulsed health signal, or a fixed logic-level, non-pulsed signal), the de-asserted signal will force the FSC to work in standby mode. For operation of the two CPU modules CPU #A, CPU #B in each FSC, each of CPU #A or CPU #B will get its own active/standby indication signal from the FSC.

Active/Standby Election

In each FSC, each CPU module CPU #A, CPU #B generates a dynamic, multi-level pulse health signal and sends it to the safety-relay box 20. The safety-relay box 20 uses the state of all four health signals to elect the active FSC. Upon system initialization, the safety-relay box 20 elects the first FSC, either FSC_#1 or FSC_#2 that asserts both healthy signals health-#1, health-#2 as the designated or active FSC. The safety-relay box 20 signals to the active FSC its active status by returning a dynamic, multi-level pulse on both its active/standby signals. In the initialization phase, normally two FSCs will be powered on at the same time, therefore a different initiation period is assigned to the two FSCs. Normally, the first FSC (either FSC_#1 or FSC_#2) that has an asserted health signal from both CPU's will be assigned the active status. If both FSC_#1 and FSC_#2 are healthy and operating in parallel (both active at the exact same time) FSC_#1 will be assigned the active status. Therefore, FSC_#2 will become the standby FSC if it succeeds in synchronization with FSC_#1. The safety-relay box 20 signals to the standby FSC its standby status by returning a static, logic 0 on the active/standby signals to both CPU modules in the standby FSC.

Safety Input

Referring to FIG. 2 and again to FIG. 1, as previously noted the health signals will come from the two CPU boards CPU #A, CPU #B of each FSC. When there is a pulse signal 28, an output 30 is activated. When pulse signal 28 is not present, either an all-0 or all-1 sending to input 32 (the unhealthy signal pattern distinguished from a signal not being present) will place output 30 in an inactivated state. An example of the input signal can be a 5V, 50% duty cycle at frequency of 10 KHz, although the disclosure is not limited to this or any specific input signal.

Failover Operation (Automatic mode) If either or both of the health signals from the active FSC are de-asserted, and both health signals from the standby FSC are asserted, the safety-relay box 20 causes a failover operation from the old active FSC to the old standby FSC. This occurs by de-asserting both active/standby signals to the old active FSC (FSC_#1) and asserting both active/standby signals to the old standby, and now newly active FSC (FSC_#2).

Failsafe Operation (Automatic mode) If either or both of the health signals from the active FSC are de-asserted, but either or both health signals from the standby FSC are not asserted, the safety-relay box 20 causes a failsafe operation by forcing both FSCs to enter the standby state by de-asserting both active/standby signals to both FSCs. In this state there is no active FSC and neither FSC is capable of sending safety critical outputs to external equipment.

Safety Output

Referring to FIG. 3 and again to FIGS. 1-2, for an exemplary ACT/STB signal, the safety output method is as follows. When an FSC needs to receive a signal from safety-relay box 20, first the FSC sends pulsed health signals to the safety-relay box 20. If a relay 34 positioned in the safety-relay box 20 is closed, the FSC receives feedback pulsed active/standby signals. If the relay 34 positioned in the safety-relay box 20 is open, the FSC cannot receive feedback pulsed active/standby signals.

Safety Internal Logic

Figure 2:
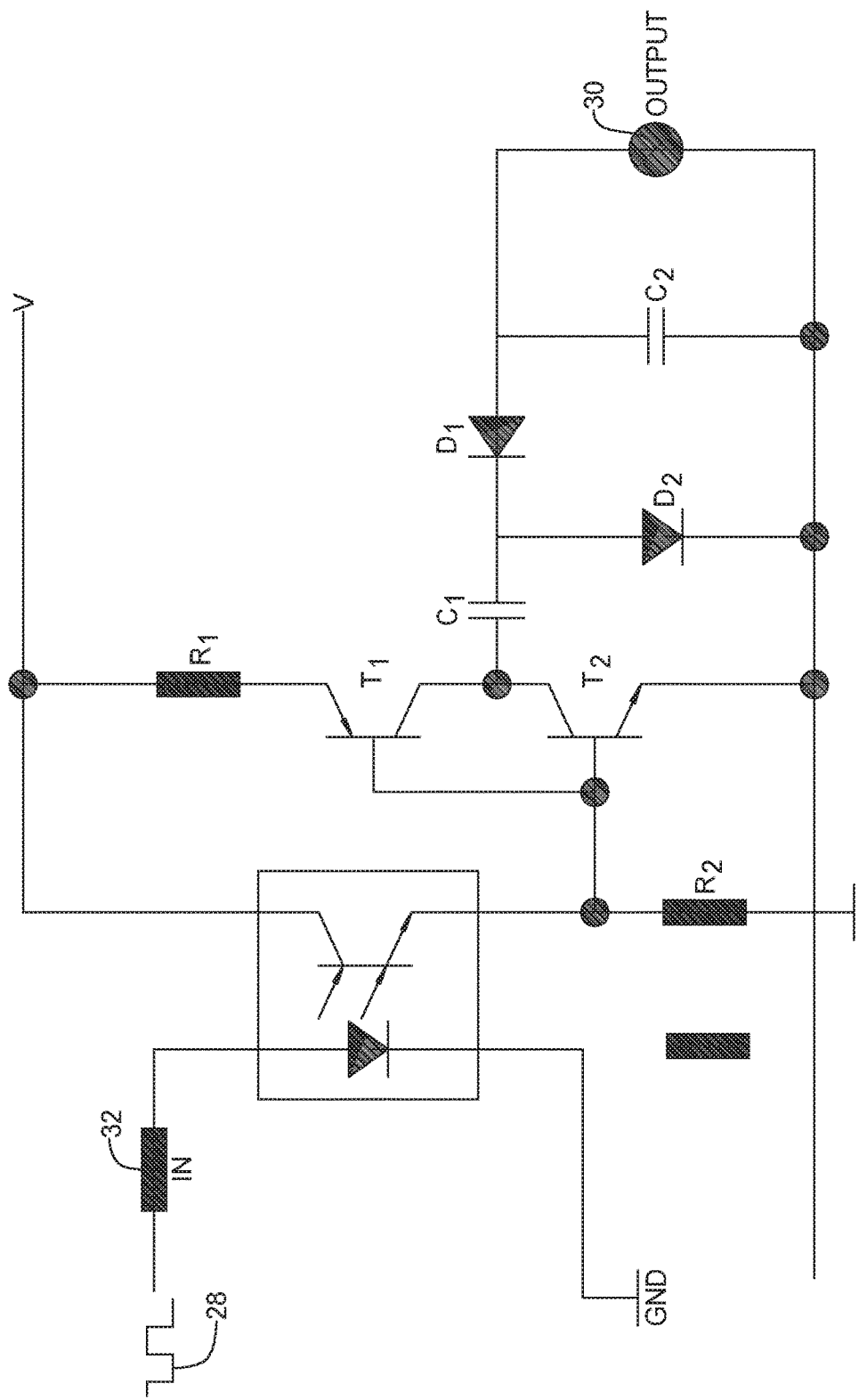
FIG. 2 is a circuit diagram for operation using a pulse signal to change a condition of an output.
Figure 3:
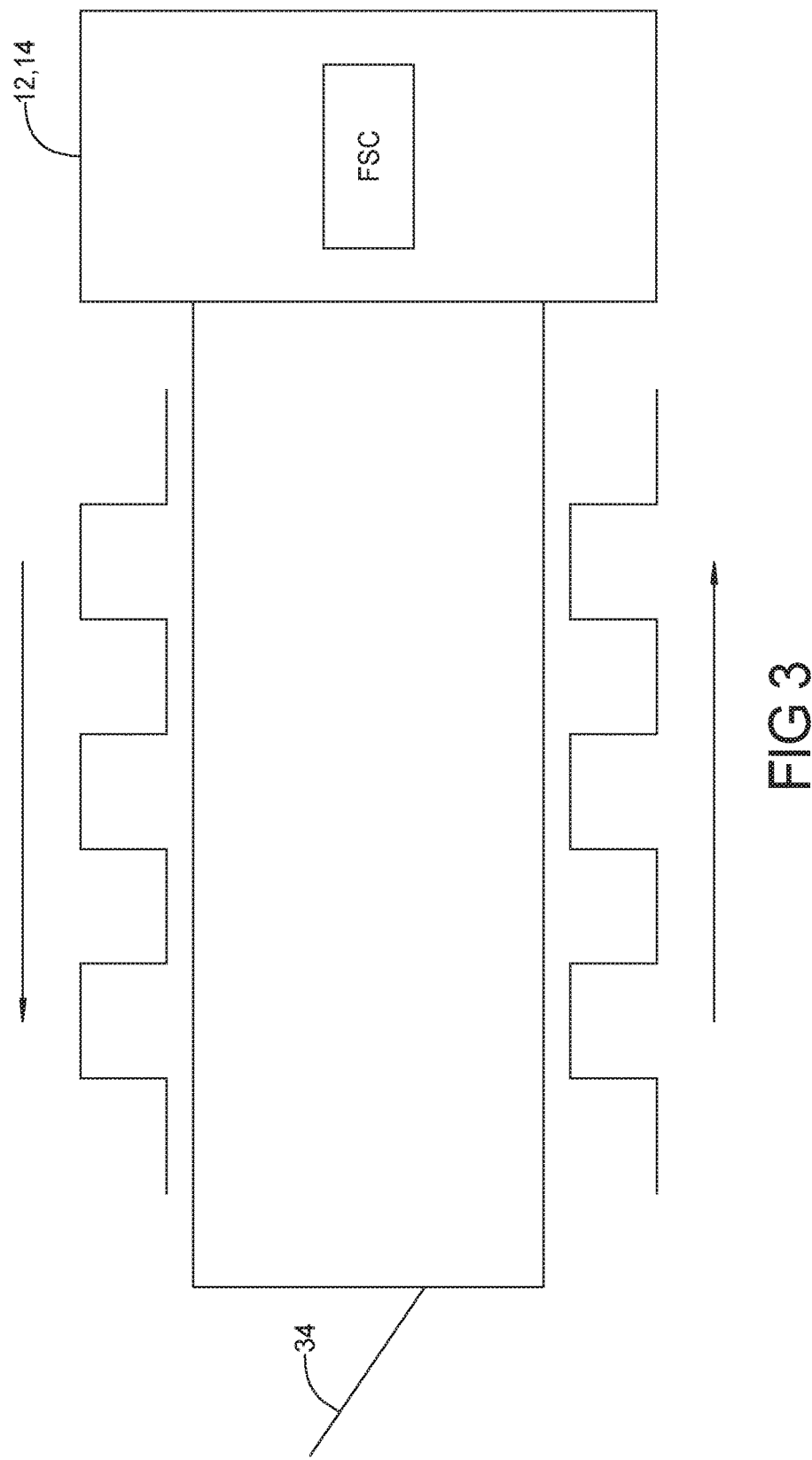
FIG. 3 is a diagram of the multi-level dynamic pulse signals used to indicate a health status of the FSCs.
Figure 4:
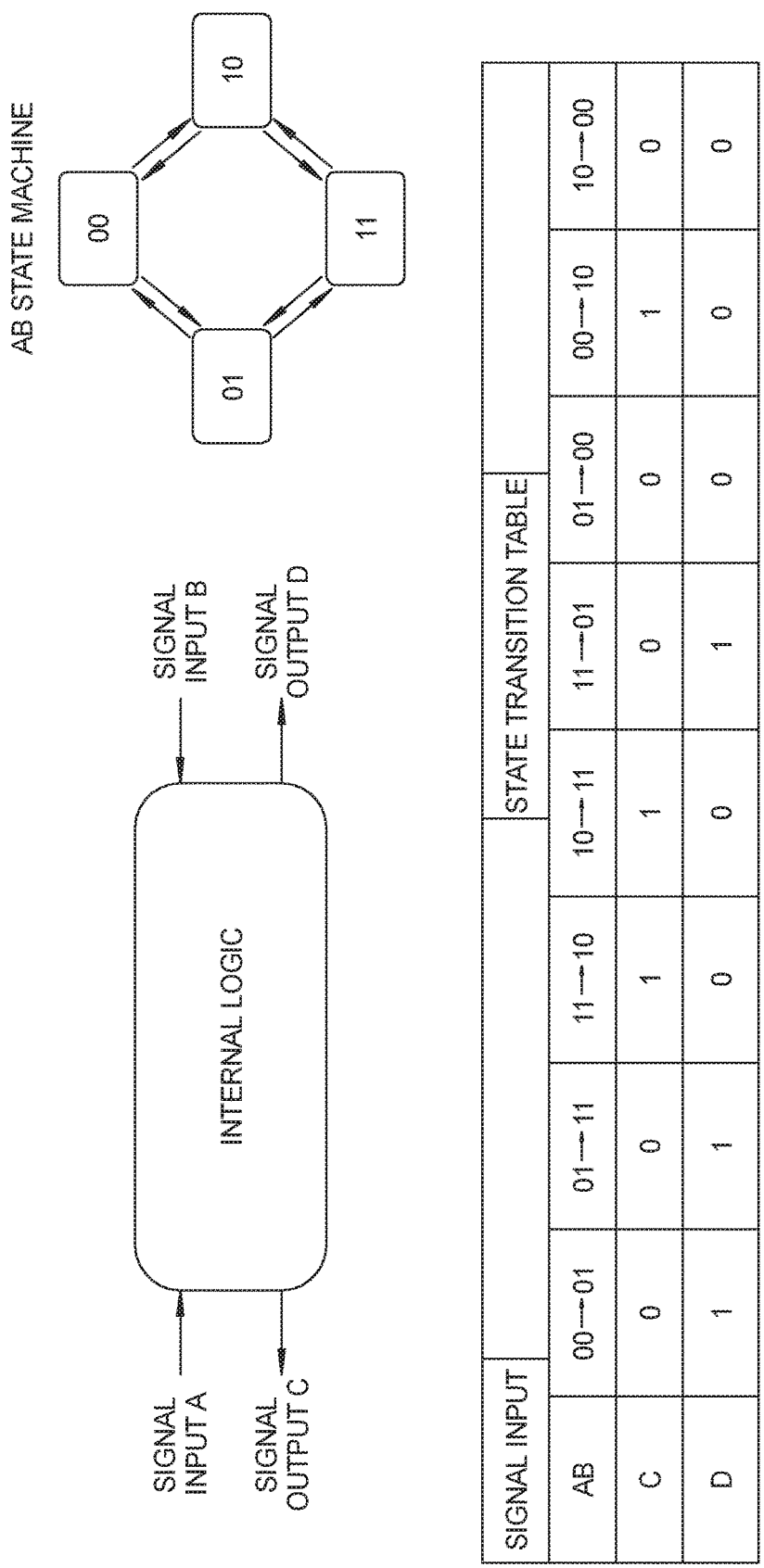
FIG. 4 is a diagram and a state transition table defining the input and output signals of the safety relay box system.

Referring to FIG. 4 and again to FIGS. 1-3, there are two group input signals. Input Group A comes from FSC_#1 (A equals Health_#1 and Health_#2), and Input Group B comes from FSC_#2 (B equals Health_#1' and Health_#2'). The four input signals (Health_#1, Health_#2, Health_#1', Health_#2') control two output signals Safety Signal Output C and Safety Signal Output D. "C" is used to designate FSC_#1, and "D" is used to designate FSC_#2. These two output signals compete for the active status, therefore if one gets the active status, the other one is forbidden to output the active status. The two outputs C and D execute a 'first input-first output' strategy.

Manual Switch Operation (Manual mode) Referring to FIG. 5 and again to FIG. 1, in addition to the automatic mode operation described above, the operator can force an individual FSC to work in the active or standby (maintenance) status. The safety-relay box 20 allows an operator to request a switchover from the active to the standby FSC by changing the 2-resting position manual switch 22 or 23 to the maintenance position. The switch selected for maintenance or standby status will then be retained in the maintenance resting position to prevent the system from returning to active status while in maintenance mode. The manual switch 22 or 23 is normally biased to remain at its last selected position. The switches 22, 23 can be repositioned to either the auto position 1 by depressing a switch portion 36 or to the maintenance position 2 by depressing a switch portion 38. This switch operation allows the operator to request a switchover to either FSC_#1 or FSC_#2 as follows:

Request switchover to FSC_#1 (assumes that FSC_#2 is currently active):
  1.) Verify that FSC_#2 is currently Active by checking an FSC_#2 Active LED.
  2.) Verify that FSC_#1 is currently Healthy by checking an FSC_#1 Healthy LED.

3.) Change switch portion 36 of switch 23 from the Auto Position to the Maintenance Position for FSC_#2.

Request switchover to FSC_#2 (assumes that FSC_#1 is currently active):

1.) Verify that FSC_#1 is currently Active by checking an FSC_#1 Active LED.
2.) Verify that FSC_#2 is currently Healthy by checking an FSC_#2 Healthy LED.
3.) Change switch portion 36 of switch 22 to change from the Auto Position to the Maintenance Position for FSC_#1.

Safety Relay Box State Machine

Referring to FIG. 6, a state machine is presented for safety relay box system 10. "Input A" indicates both health signals from FSC_#1. In order for Input A to be asserted ("1"), both health signals from FSC_#1 must be asserted. A similar argument holds for Input B and the two health signals from FSC_#2. Similarly, when the state machine asserts an output C, it asserts both active/standby signals to FSC_#1, and when it negates output C, it negates both active/standby signals to FSC_#1. A similar argument holds for an output D and both active/standby signals to FSC_#2. When the outputs are "00" there is no active FSC. When the outputs are "10", FSC_#1 is active. When the outputs are "01", FSC_#2 is active. It is never the case that both outputs are asserted (outputs="11"), so it is never the case that both FSCs are active.

Referring to FIG. 7 and again to FIG. 1, safety relay box 20 includes first and second module portions 40, 42 hereinafter referred to as safety relay module portion M#1 and safety relay module portion M#2 mounted to a backplane 44. The connection between the first and second safety relay modules 40, 42 guarantees that only one or less of the safety relay modules will be active at any time. When one relay module is active, its K_NC contact 46, 48 will be open, isolating the power supply from the other relay module.

Referring again to FIG. 5, the 2-position manual switches 22, 23 each provide a choice between two operating modes: an FSC auto mode, and an FSC forced maintenance or standby mode. The forced maintenance mode also defines a manual switch mode. It is noted that an FSC healthy signal will disable the ACT/STB signal (shown in FIG. 1) with the highest priority, no matter whether it is in automatic active or maintenance/standby mode. For example, when manual switch 22 is in position 1, safety relay box 20 will function in the normal auto-fail-over mode. When manual switch 22 is in position 1, K_NC contact 46 is disconnected and second module portion 42 will be cut off from the power supply line. As described above, safety relay box 20 will connect FSC_#1 in a forced operating mode. When manual switch 22 is in position 2, K_NC contact 48 will be disconnected and first module portion 40 will be cut off from the power supply line. As described above, safety relay box 20 will connect FSC_#2 in a forced operating mode. The internal switch (K-NC and K_NO) in each safety relay module portion is controlled by external KA and KB, which are driven by a healthy indication signal. K_NC will be changed to disconnected status and K_NO be changed to connected status only when both KA and KB are in connected status. Otherwise, K_NO will be kept in safety disconnected status and K_NC will be kept in connected status, which is shown as the default status in FIG. 7. K_NC is used as a mutual exclusion mechanism between the first and second FSCs FSC_ #1 and FSC_#2 to guarantee that only one FSC is active at any time.

In automatic mode, at the moment when both FSC's are powered on, because neither FSC passes the initiation phase, there is no healthy indication to safety relay box 20. The two safety relay module portions M#1 and M#2 will be supplied power but will have an inactive status. Therefore, K_NO is still in the open status and no active indication signal is presented to either FSC_#1 or FSC_#2. At a later time, if FSC_#1 is the first to send out a healthy indication signal, at that time K_NO is enabled to connection status, while K_NC is enabled to disconnection status. At this moment, FSC_#1 will receive an active signal from safety relay box 20, because K_NO is connected to bypass the dynamic healthy signal. Further, the power supply to safety relay module portion M#2 is cut off because K_NC in safety relay module portion M#1 is in open status. FSC_#2 cannot become active at this time, no matter if it is healthy or not. In this mutually exclusive way, safety relay box 20 guarantees that there is only one active FSC in the redundant system.

If at a later time FSC_#2 completes its initiation phase and sends a healthy indication signal to safety relay box 20, FSC_#2 will not have an active indication, because its safety relay module portion M#2 is powered off. If at a later time FSC_#1 becomes unhealthy, the internal switch (K_NO, K_NC) in safety relay module portion M#1 will return to default status resulting in FSC#1 having a standby indication. Further, the K_NC of safety relay module portion M#1 will be connected, which in turn powers on safety relay module portion M#2. Safety relay module portion M#2 will be activated because it is powered on and has a good input. As result, the K_NO of safety relay module portion M#2 is enabled to connection status, while its K_NC is enabled to disconnection status, resulting in FSC_#2 having an active signal. Further, the power supply for safety relay module portion M#1 will be cut off, which guarantees that FSC_#1 will be in standby status no matter whether it is healthy or not.

Generation of Active/Standby Dynamic Signal.

In order for the safety relay box 20 to elect one of the FSCs active, both healthy signals from that FSC must be asserted, with both healthy signals having a dynamic wave form on the signal. To signal that an FSC should go active, safety relay box 20 merely closes the K_NO switch in one of the safety relay module portions M#1 or M#2 and sends the incoming dynamic healthy status signals back to the FSC as the outgoing dynamic active/standby control signals.

Figure 7A:
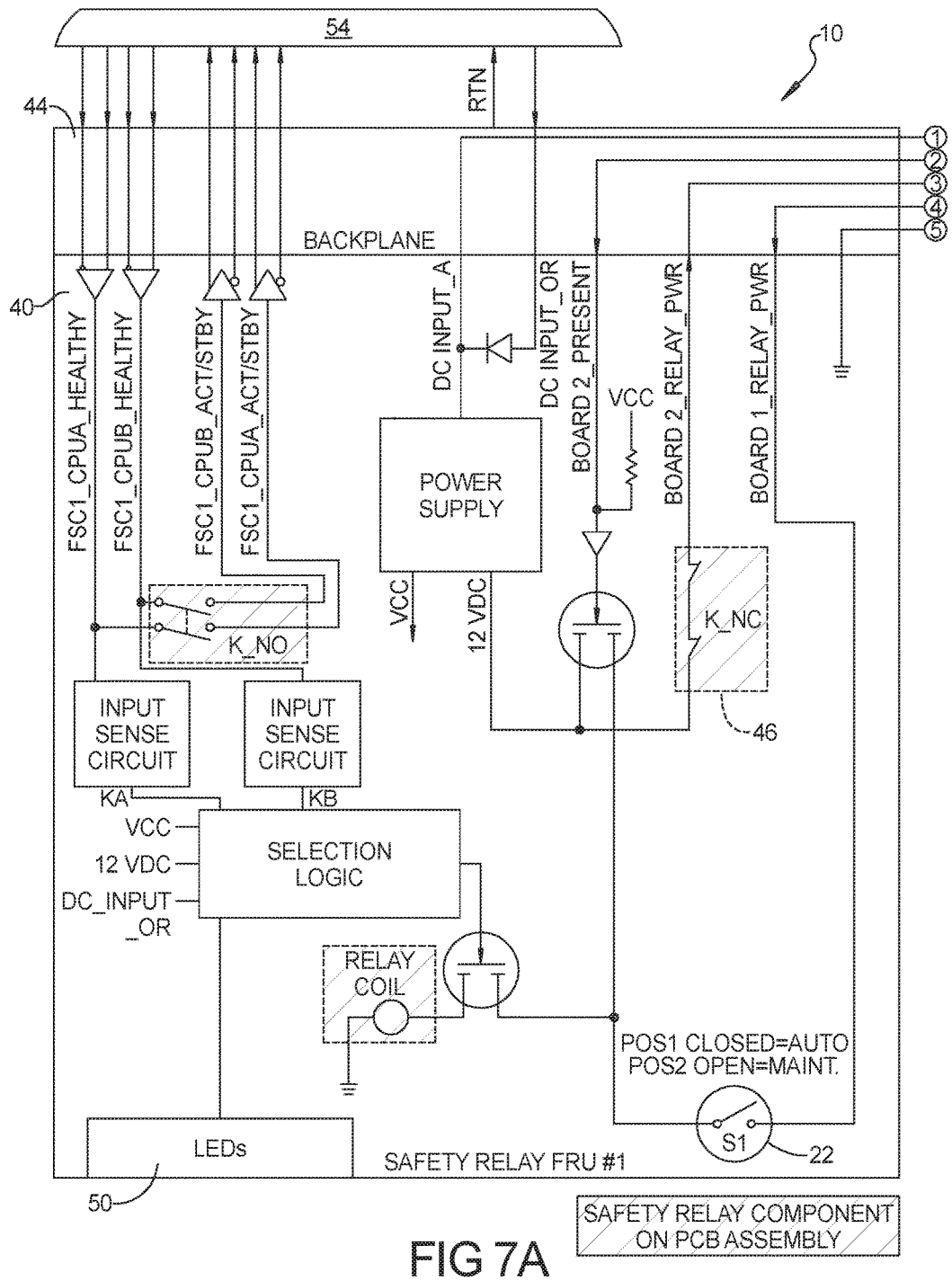
FIGS. 7A, 7B are each of the first and second circuit diagrams of the two printed circuit board design of the present disclosure.
Figure 7B:
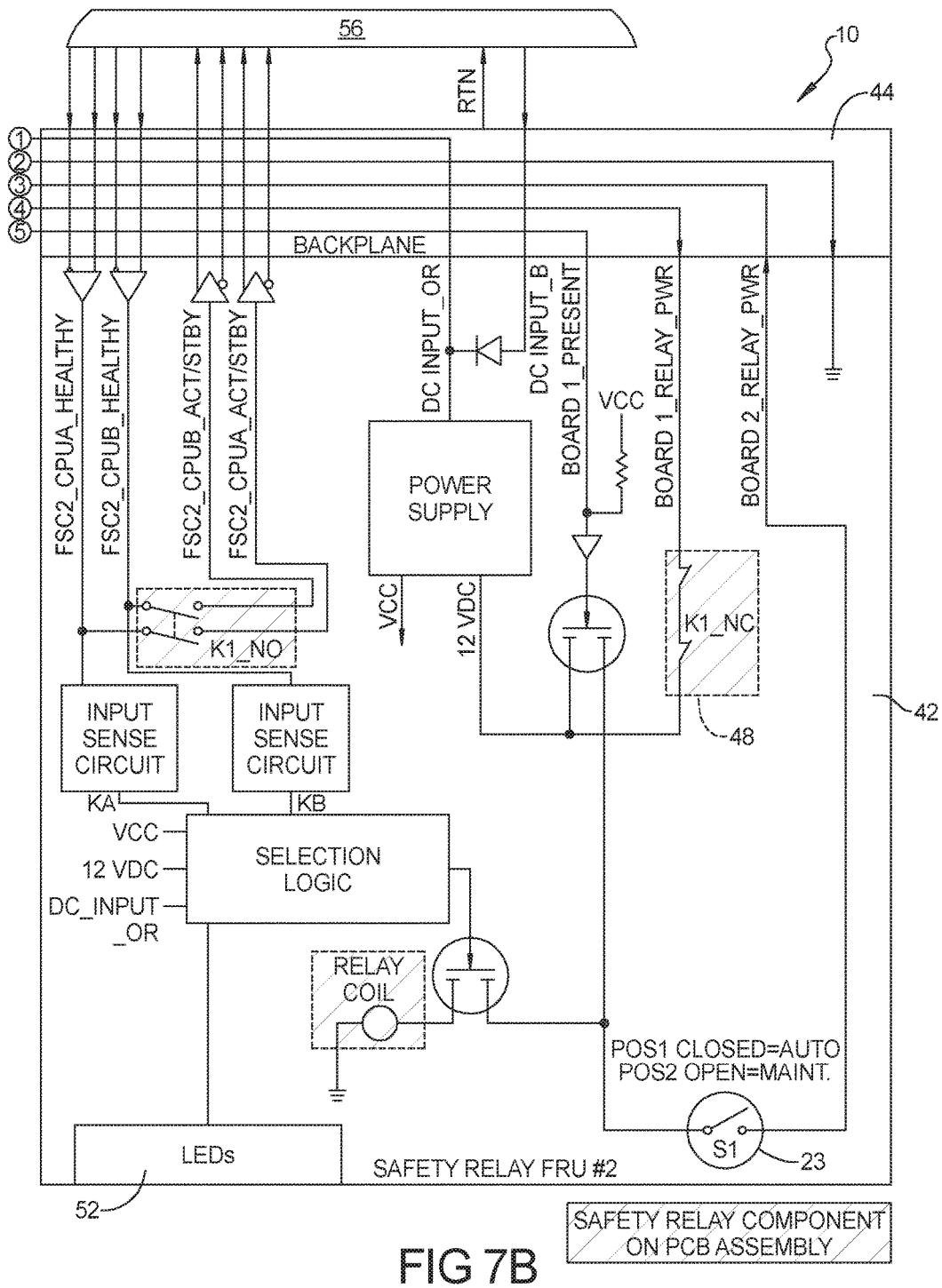

With continuing reference to FIG. 7, each of the first and second module portions 40, 42 includes a set of LEDs 50, 52 which visually indicate the operating status of the individual CPUs 16, 18 of FIG. 1. Each of the first and second module portions 40, 42 can also be individually connected to a separate power supply via connectors 54, 56.

The fail-safe safety relay box systems of the present disclosure offer several advantages. Because individual ones of the printed circuit boards 40, 42 are isolable from each other, performance of maintenance on one of the printed circuit boards is available while fail-safe operation of the FSC of the other printed circuit board is maintained. Known fail-safe systems have all of the components commonly mounted/connected, thus performance of maintenance requires the entire system to be shut down. The fail-safe safety relay box systems of the present disclosure also utilize dynamic health signals which vary in pulse. When a varying pulse signal is identified from one of the FSCs, the FSC is deemed to be healthy. In contrast, known systems which utilize a fixed voltage signal can produce the fixed voltage even when the components are in a failed state, therefore indication of a fixed voltage signal does not always indicate a healthy FSC. In addition, as a further safety feature, in order for the safety relay box 20 to elect one of the FSCs active, both healthy signals from that FSC must be asserted (indicated by a varying pulse).

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A dual redundant computer safety relay box system, comprising:
    first and second fail-safe computing systems (FSCs) individually connected to a respective first printed circuit board and a second printed circuit board;
    each FSC including two computing modules (CPUs) designated as a first CPU and a second CPU, each CPU generating a respective healthy indication signal;
    the first and second FSC's both connected to a safety relay box, the safety relay box including the first and second printed circuit boards;
    wherein the first printed circuit board of the safety relay box receives the respective healthy indication signals from the first and second CPUs of the first FSC and the second printed circuit board of the safety relay box receives the respective healthy indication signals from the first and second CPUs of the second FSC, and wherein the safety relay box determines which of the two FSCs to make active in accordance with the four healthy indication signals; and
    the printed circuit boards are isolable from each other to permit maintenance on one of the printed circuit boards while operation of the FSC controlled by the other printed circuit board is maintained.

2. The dual redundant computer safety relay box system of claim 1, wherein each of the first and second FSCs is connected to one of a first or second manual switch, the first and second manual switches each having a first switch position defining an auto status and a second switch position defining a maintenance status.

3. The dual redundant computer safety relay box system of claim 2, wherein:
    the first switch position is manually selected by depressing the manual switch to change to the first position indicating the operator's request to allow the safety relay box to automatically select which FSC is the active FSC; and
    the second switch position is manually selected by depressing the manual switch to change to the second position indicating the operator's request to place the FSC controlled by this switch to go to the maintenance mode wherein the FSC is not allowed to go to the active role while in the maintenance mode.

4. The dual redundant computer safety relay box system of claim 1, wherein in each FSC a health signal is generated from the first and second printed circuit boards of the first and second CPUs, each health signal defining a dynamic pulse signal.

5. The dual redundant computer safety relay box system of claim 4, wherein presence of the dynamic pulse signal produces an output identified as each of a first and a second health signal designating a healthy indication signal from each of the CPUs.

6. The dual redundant computer safety relay box system of claim 5, wherein an asserted health signal indicates a healthy status of the related FSC; and a de-asserted health signal indicates an unhealthy status of the related FSC.

7. The dual redundant computer safety relay box system of claim 5, wherein any one of the FSCs is indicated as healthy only when both CPUs of the FSC send out the healthy indication signals.

8. The dual redundant computer safety relay box system of claim 1, wherein a first one of the FSCs to boot up first is designated an active FSC, and the second one of the FSCs to boot up at a later time is designated as a standby FSC; and
when the second one of the FSCs succeeds in powering up with the first FSC the safety-relay box signals to the standby FSC its standby status by returning a standby status signal to both of the CPU modules in the standby FSC.

9. The dual redundant computer safety relay box system of claim 5, wherein in an automatic mode if either or both of the health signals from the active FSC are de-asserted, and either or both health signals from the standby FSC are not asserted, the safety-relay box causes a failsafe operation by forcing both FSCs to enter the standby state wherein there is no active FSC and neither FSC is capable of sending a safety critical output to external equipment.

10. A dual redundant computer safety relay box system, comprising:
first and second fail-safe computing systems (FSCs) individually connected to a respective first printed circuit board and a second printed circuit board;
each FSC including two computing modules (CPUs) designated as a first CPU and a second CPU defining a safety relay module portion;
a safety relay box connected to the first and second, each CPU generating a respective healthy indication signal, the safety relay box including the first and second printed circuit boards,
wherein the first printed circuit board of the safety relay box receives the respective healthy indication signals from the first and second CPUs of the first FSC and the second printed circuit board of the safety relay box receives the respective healthy indication signals from the first and second CPUs of the second FSC, and wherein the safety relay box determines which of the two FSCs to make active in accordance with the four healthy indication signals; and
in each FSC a health signal generated from the first and second printed circuit boards of the first and second CPUs defines a multi-level dynamic pulse signal, wherein presence of the dynamic pulse signal produces an output identified as each of a first and a second healthy indication signal from each of the CPUs of one of the first or second FSCs.

11. The dual redundant computer safety relay box system of claim 10, wherein the safety relay box is connected to a first manual switch controlling the first FSC and the safety relay box is connected to a second manual switch controlling the second FSC, the first and second manual switches each having a first switch position defining an auto status of the FSC and a second switch position defining a maintenance status of the FSC.

12. The dual redundant computer safety relay box system of claim 11, wherein following change from either the first to the second switch position or from the second to the first switch position of the first and second manual switches one of the FSC's is selected as a standby FSC defining a "standby" role in which the standby FSC is available to assume an active role if the active one of the FSCs fails.

13. The dual redundant computer safety relay box system of claim 10, wherein the printed circuit boards are isolable from each other to permit maintenance on one of the printed circuit boards while operation of the FSC controlled by the other printed circuit board is maintained.

14. The dual redundant computer safety relay box system of claim 10, wherein the safety relay box elects one of the FSCs as an active FSC only if both healthy indication signals from that FSC are asserted, and with both healthy indication signals having a dynamic wave form on the signal.

15. The dual redundant computer safety relay box system of claim 10, wherein in each FSC, after each of the first and second CPUs generates the multi-level dynamic pulse health signal and sends it to the safety-relay box, the safety-relay box identifies a state of all four health signals from both FSCs to elect an active FSC, such that upon system initialization, the safety-relay box elects the first one of the first or second FSCs that asserts both healthy indication signals as a designated active FSC.

16. A dual redundant computer safety relay box system, comprising:
first and second fail-safe computing systems (FSCs) individually mounted to a respective first printed circuit board and a second printed circuit board;
each FSC including two computing modules (CPUs) designated as a first CPU and a second CPU;
the first and second FSC's both connected to a safety relay box, each CPU generating a respective healthy indication signal, the safety relay box including the first and second printed circuit boards,
wherein the first printed circuit board of the safety relay box receives the respective healthy indication signals from the first and second CPUs of the first FSC and the second printed circuit board of the safety relay box receives the respective healthy indication signals from the first and second CPUs of the second FSC, and wherein the safety relay box determines which of the two FSCs to make active in accordance with the four healthy indication signals;
the printed circuit boards are isolable from each other to permit maintenance on one of the printed circuit boards while operation of the FSCs of the other printed circuit board is maintained; and
in each FSC a health signal generated from the first and second printed circuit boards of the first and second CPUs defines a multi-level dynamic pulse signal, wherein presence of the dynamic pulse signal produces an output identified as each of a first and a second healthy indication signal from each of the CPUs of one of the first or second FSCs.

* * * * *